W. J. FULLER.
STUMP PULLER.
APPLICATION FILED JAN. 14, 1914.
1,122,898.
Patented Dec. 29, 1914.
2 SHEETS—SHEET 2.
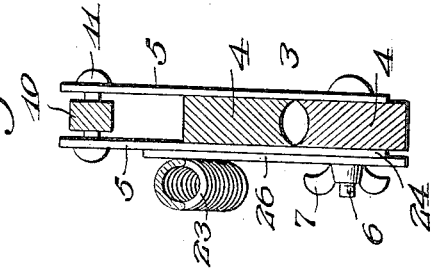
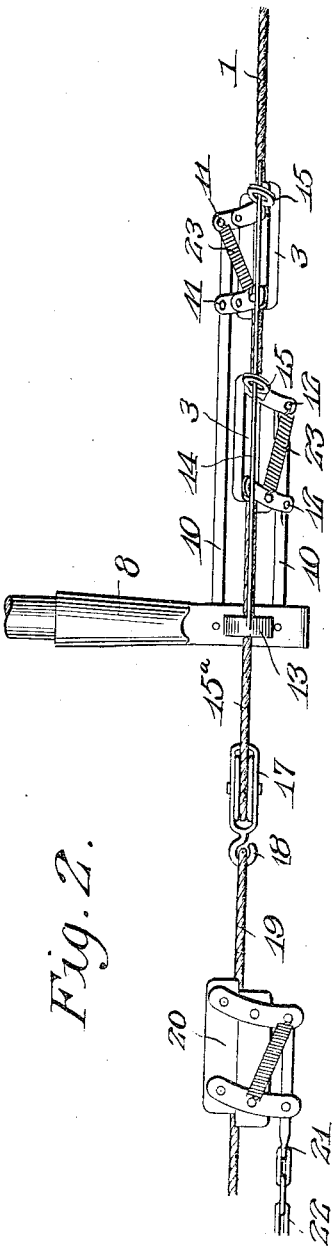
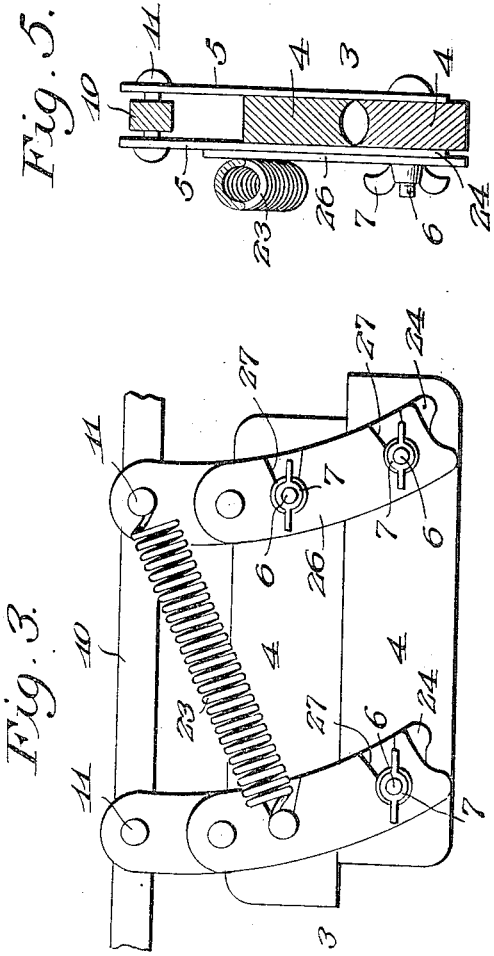
Witnesses
Hugh H. Ott
John J. McCarthy
Inventor
William J. Fuller
By Victor J. Evans
Attorney

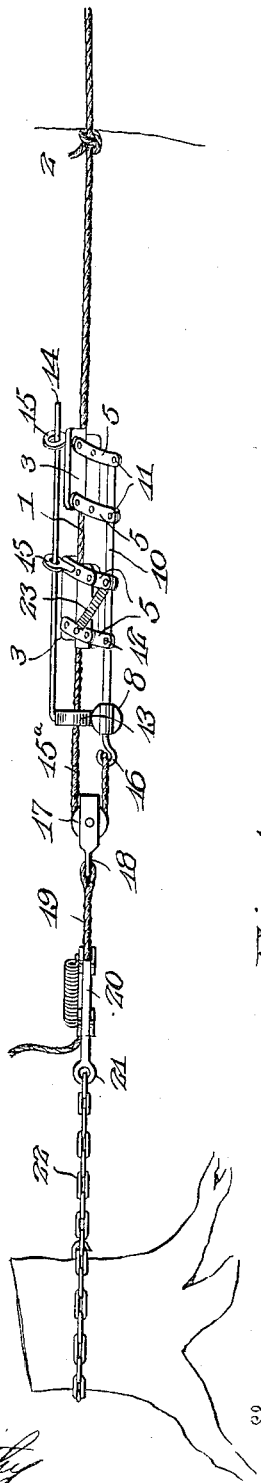

UNITED STATES PATENT OFFICE.

WILLIAM JOY FULLER, OF HAZARD, KENTUCKY.

STUMP-PULLER.

1,122,898.

Specification of Letters Patent.

Patented Dec. 29, 1914.

Application filed January 14, 1914. Serial No. 812,062.

*To all whom it may concern:*

Be it known that I, WILLIAM J. FULLER, a citizen of the United States, residing at Hazard, in the county of Perry and State of Kentucky, have invented new and useful Improvements in Stump-Pullers, of which the following is a specification.

This invention relates to improvements in stump pullers or extractors and has particular application to a hand operated stump pulling device.

In carrying out the present invention, it is my purpose to provide a stump pulling device whereby an enormous pull may be exerted upon the stump or other object with a minimum effort on the part of the operator.

It is also my purpose to provide a device of the class described which will embrace the desired features of simplicity, efficiency and durability, one which may be set up quickly and manipulated with ease and convenience.

With the above and other objects in view, the invention consists in the construction, combination and arrangement of parts hereinafter set forth in and falling within the scope of the claims.

In the accompanying drawings; Figure 1 is a view in side elevation of a stump extracting device constructed in accordance with my present invention. Fig. 2 is a top plan view thereof. Fig. 3 is an enlarged side elevation of one of the grippers. Fig. 4 is a fragmentary side elevation of one of the grippers showing the fastening means for the jaws thereof on an enlarged scale. Fig. 5 is a transverse sectional view through one of the grippers.

Referring now to the accompanying drawings in detail, 1 designates a cable, rope or other flexible element having one end anchored in some suitable manner as at 2.

Mounted upon the cable 1 and suitably spaced apart are grippers 3, 3 each comprising a pair of jaws 4 having the confronting faces normally in frictional engagement with the cable and connected to each other through the medium of links 5 disposed upon the opposite sides of the grippers adjacent to the ends of the jaws. In the present instance, headed pivot pins 6 are passed through the links and respective jaws and form pivotal connections between the links and the jaws and the free end of each pivot pin is threaded to receive a thumb nut 7.

8 indicates an operating lever formed adjacent to its lower end with an elongated slot 9 and pivoted within the slot 9 and spaced apart are rods 10, 10. One of the rods 10 is relatively long as compared with the length of the other, while the lower ends of the links 5 connecting the jaws of the grippers are projected beyond the adjacent edges of the lower jaws.

The lower ends of the links of one gripper are pivotally connected with the outer end of the relatively long rod 10 by means of pivot bolts 11, while the lower ends of the link of the other gripper are pivotally connected to the outer end of the short rod 10 by means of pivot pins 12. Connected to the operating lever 8 and projecting laterally therefrom is a ring 13 disposed between the rods 10, 10 and having connected thereto one end of a guide rod 14 passed through eyes 15 formed in the upper ends of the links of the grippers.

The forward end of the cable 1 is passed through the ring 13 and looped as at 15 and then connected with a hook 16 fastened on the lever 8 between the rods 10, 10. Mounted within the looped portion 15ª of the cable is a pulley block 17 equipped with a hook 18 connected with one end of a second cable 19. The cable 19 is passed through a gripper 20 constructed after the fashion of the first grippers. To one jaw of the gripper 20 is connected a ring 21 carrying a chain 22 adapted for attachment on the stump or other object to be uprooted or extracted.

In practice, the parts are assembled as in Fig. 2 and the chain 22 connected with the stump to be extracted and the free end of the cable 1 anchored as illustrated. The operating lever 8 is now rocked back and forth and in the forward movement of the handle end of the lever the jaws of the rear gripper slide along the cable toward the looped end thereof, while the jaws of the advance gripper grasp the cable and exert a rearward pull thereon. Upon the reverse movement of the lever the jaws of the rear gripper grasp the cable and exert a pull thereon, while the jaws of the forward gripper slide over the cable toward the looped end thereof so that a fresh grip may be obtained thereon. In the present instance, the jaws of the gripper are held in frictional engagement with the cable by means of a coiled contractile spring 23 having one end fastened to the depending end of one of the links and the opposite end secured to the adjacent surface of the lower jaw.

In this embodiment of my invention, the links upon one side of each gripper are each formed of a section 24 formed with slots 25 receiving the respective ends of the pivot bolts of the jaws of the gripper, and a section 26 pivotally mounted upon the section 24 and formed with slots 27 designed to receive the respective pivot bolts, the sections 26 being slidable over the outer faces of the sections 24. By means of this construction, it will be seen that the jaws of each gripper may be readily assembled and disconnected.

From the foregoing description taken in connection with the accompanying drawings, the construction, mode of operation and manner of employing my invention will be readily apparent. It will be seen that I have provided a stump extractor or puller whereby the jaws automatically grip and release the cable in the manipulation of the operating lever.

I claim:

1. In a device of the class described, an anchored cable, a pulling mechanism comprising an operating lever, grips mounted upon said cable and each embodying jaws grasping the cable, links pivotally connecting the jaws of each grip, springs acting upon said jaws and holding the same normally in engagement with the cable, and connections between said grips and lever whereby in the swinging of the latter the grips will be moved back and forth on the cable to alternately grasp and release the same, a hook carried by said lever and connected to the free end of said cable whereby a loop in the cable is formed, a pulley block in said loop, a second cable connected with said pulley block, a grip on said second cable, and a connection between said grip and the object to be pulled.

2. In a device of the class described, an anchored cable, a pulling mechanism comprising an operating lever, grips mounted upon said cable and each embodying jaws grasping the cable, links pivotally connecting the jaws of each grip, springs acting upon said jaws and holding the same normally in engagement with the cable, and connections between said grips and lever whereby in the swinging of the latter the grips will be moved back and forth on the cable to alternately grasp and release the same, a hook carried by said lever and connected to the free end of said cable whereby a loop in the cable is formed, a pulley block in said loop, and a connection between said pulley block and the object to be pulled.

In testimony whereof I affix my signature in presence of two witnesses.

WILLIAM JOY FULLER.

Witnesses:
DEMEY DANIEL,
BASIL MESSEL.

Copies of this patent may be obtained for five cents each, by addressing the "Commissioner of Patents, Washington, D. C."